United States Patent [19]
Ziu

[11] Patent Number: 5,590,690
[45] Date of Patent: Jan. 7, 1997

[54] CENTERING SUPPORT FOR DOUBLE-CONTAINMENT PIPE ASSEMBLY

[75] Inventor: Christopher G. Ziu, 9 Douglas St., Merrimack, N.H. 03054

[73] Assignee: Christopher G. Ziu, Merrimack, N.H.

[21] Appl. No.: 419,196

[22] Filed: Apr. 10, 1995

Related U.S. Application Data

[63] Continuation-in-part of Ser. No. 885,670, Aug. 17, 1992, Pat. No. 5,404,914.

[51] Int. Cl.⁶ .................................................. F16L 9/18
[52] U.S. Cl. ........................ 138/113; 138/103; 138/104; 138/108; 138/178
[58] Field of Search ............................... 138/113, 114, 138/108, 110, 111, 160, 159, 177, 103, 104, 178; 174/99 R; 248/49

[56] References Cited

U.S. PATENT DOCUMENTS

| | | | |
|---|---|---|---|
| 3,785,407 | 1/1974 | Waite et al. | 138/108 |
| 3,927,464 | 12/1975 | Wallsten | 138/115 X |
| 3,964,754 | 6/1976 | Murai et al. | 138/108 X |
| 5,197,518 | 3/1993 | Ziu | 138/113 |
| 5,303,744 | 4/1994 | Eriksson | 138/113 X |
| 5,399,812 | 3/1995 | Woszczyna et al. | 138/115 X |

*Primary Examiner*—Patrick Brinson
*Attorney, Agent, or Firm*—McCormick, Paulding & Huber

[57] ABSTRACT

A centering support for a double-containment pipe assembly is adapted to support a plurality of primary pipes within a single containment pipe. A first support half of the centering support defines a plurality of first curved support surfaces for supporting one or more primary pipes, wherein each first curved support surface is defined by a radius greater than or equal to the outside radius of the primary pipe to be supported by the respective support surface. A second support half of the centering support similarly defines a plurality of second curved support surfaces for supporting one or more primary pipes, and each second curved support surface is defined by a radius greater than or equal to the outside radius of the primary pipe to be supported by the respective support surface. Fasteners are used to join the first support half to the second support half and move the first and second support halves toward each other, to in turn move the first and second curved support surfaces toward the respective primary pipes and fix the primary pipes within the containment pipe.

18 Claims, 5 Drawing Sheets

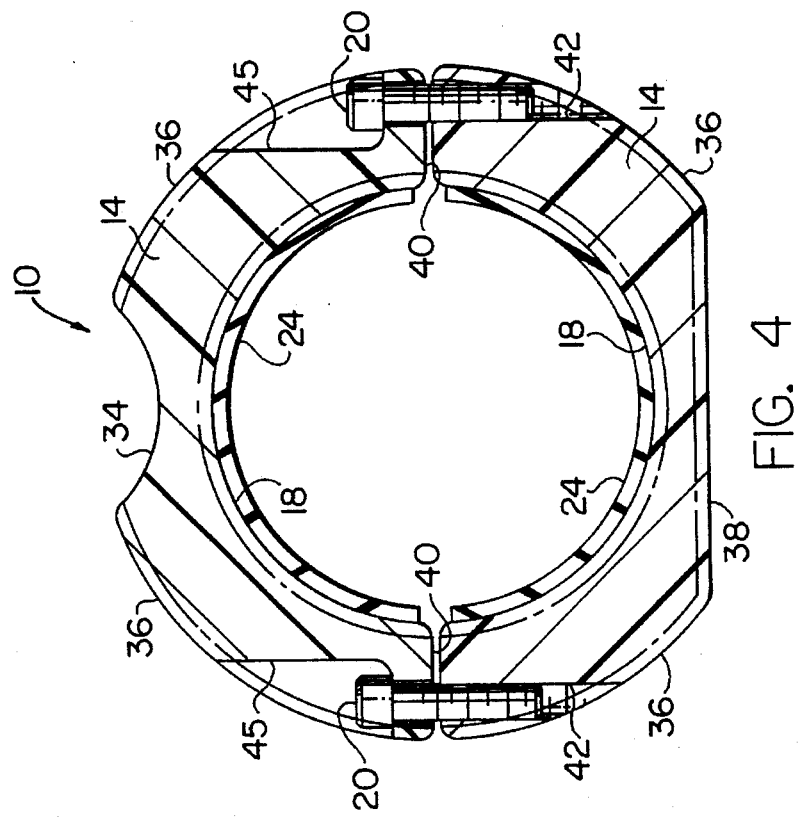
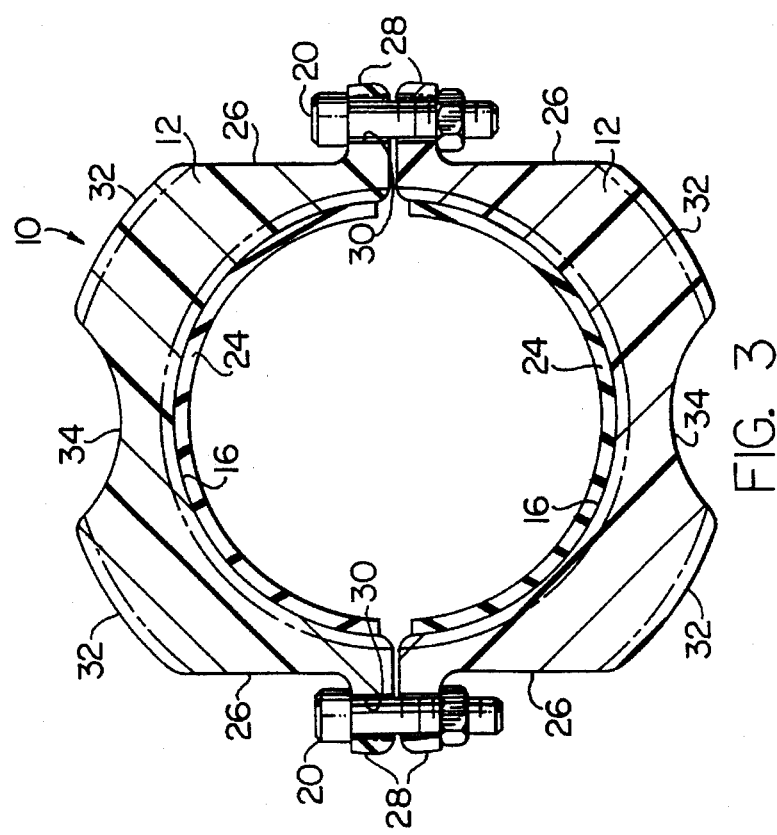

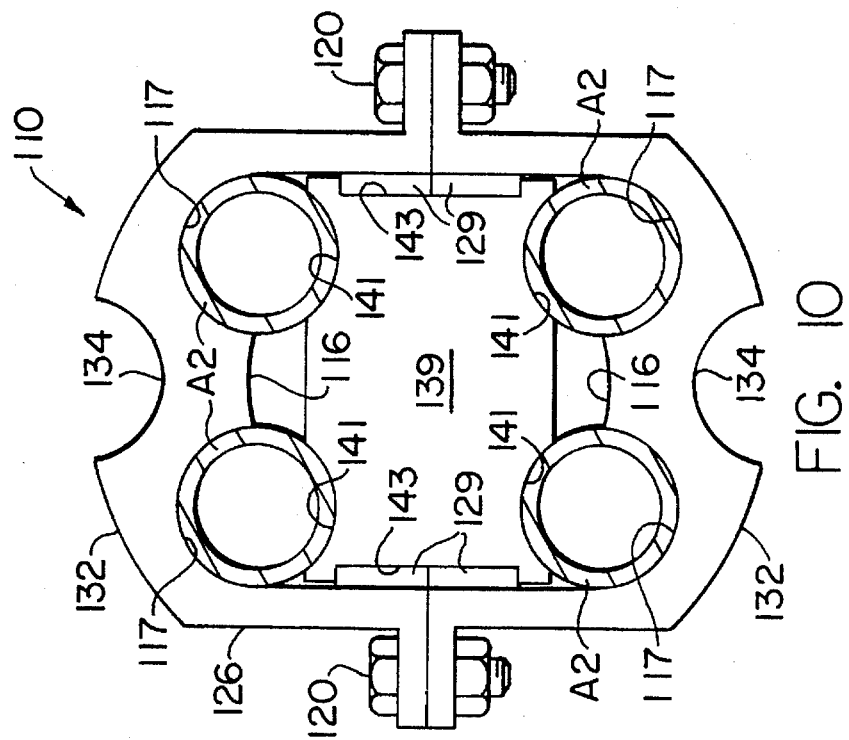
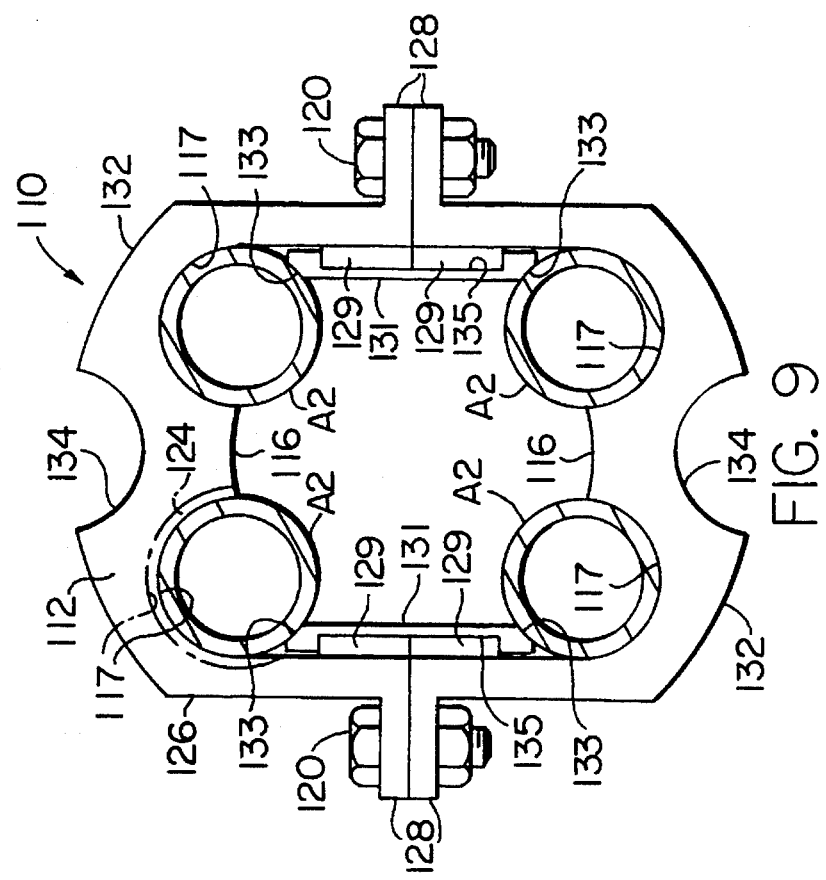

CENTERING SUPPORT FOR DOUBLE-CONTAINMENT PIPE ASSEMBLY

CROSS-REFERENCE TO RELATED APPLICATION

This patent application is a continuation-in-part of U.S. patent application Ser. No. 07/885,670, filed Aug. 17, 1992, now U.S. Pat. No. 5,404,914.

FIELD OF THE INVENTION

The present invention relates to double-containment pipe assemblies wherein an inner or primary pipe is located within an outer or containment pipe, and more particularly, to support apparatus for supporting one or more inner or primary pipes within an outer or containment pipe.

BACKGROUND INFORMATION

Hazardous fluids are routinely conveyed within enclosed pipes or conduits. Recognizing that such pipes and conduits can leak due to manufacturing defects, excessive pressure, corrosion, and joint defects, for example, which may be due to thermal stresses, double-containment piping systems have been developed in which an inner or primary pipe is located within an outer or containment pipe forming an annulus between the inner and outer pipes. The annulus is typically dry, except in the event of a leak of fluid carried by the inner pipe.

Double-containment piping systems are now widely used, which is due in part to the enactment in the United States of improvements to the Resource Conservation and Recovery Act in 1988 and to the Clean Water Act in 1990. For example, double-containment piping systems are now used for such applications as gasoline-station piping, fuel-oil piping for underground storage tanks that supply fuel oil for heating systems in buildings, chemical piping in a variety of applications, chemical sewers, process sewers and landfill systems.

In many known double-containment piping systems, the inner pipe is typically supported by resting directly on the lower, inside wall of the outer pipe. Alternatively, support apparatus are provided in which the inner pipe is supported in spaced relation to the inside wall of the outer pipe. Exemplary supports are illustrated in the following U.S. patents: U.S. Pat. Nos. 5,141,184; 5,018,260; 4,751,945; 3,863,679; and 3,417,785.

Although such prior supports may be used to support the inner pipe within the outer pipe, and provide ready access to the inner pipe at spaced locations along the outer pipe, such supports are typically joined to the inner pipe and/or the outer pipe by welding or bonding means to secure the support in place. The welding or bonding process can require significant construction and assembly time, which results in added project costs, and further prolongs the installation time of the double-containment piping system. The welding or bonding process also typically requires that the support be made of the same material as either the inner or the outer pipe so that it can be adequately welded or bonded to the respective pipe. Accordingly, any flexibility in selecting the material for the support is frequently limited by the materials of the inner and outer pipes.

Prior supports also frequently directly support an inadequate portion of the inner pipe in comparison to that which is typically required for single-wall above-ground pipes. For example, there are one-piece collar-type supports which by design fit less than perfectly around the external circumference of the inner pipe, in order to slip the support into position over the inner pipe. This type of collar support is then secured in place typically by welding or otherwise bonding the support to the inner pipe. Thus, although such a support may surround the inner pipe, it typically does not maintain sufficient support of the entire circumference of the inner pipe because its inner diameter is inherently greater than the outer diameter of the inner pipe. This is a particular disadvantage with fiberglass pipes, which typically require uniform support along a substantial portion of the circumference of the inner pipe.

In some double-containment piping applications, it would be desirable to have multiple inner or primary pipes mounted within a single outer or containment pipe. This may be advantageous, for example, where there are several primary pipes that run in the same direction or otherwise follow the same path or route. If the several primary pipes were mounted within a common containment pipe, then a single means of leak detection could be employed, thus making the overall system more economical. This type of double-containment system may also be desirable where there are space limitations preventing each primary pipe from being individually housed within a respective containment pipe. A typical example for this type of system would be one for supplying fuel oil from a storage tank to several burners in a building basement. In this type of system, it is common to have several supply lines running from the storage tank to the burners, and several return lines, or a single return line running from the burners back to the storage tank. There may also be one or more fuel tanks in series, wherein each tank may have one or more supply and return lines, and all such lines follow essentially the same route between the burners and the tanks. Similar arrangements may be used in gasoline stations for pumping the gasoline between several fuel pumps and one or more underground fuel storage tanks. In such applications, it would be desirable to house a plurality of primary pipes within a single containment pipe, and to have a centering support suitably designed to support each of the individual primary pipes within the single containment pipe. It would also be desirable for such a centering support to maintain the primary pipes in a consistent geometric arrangement throughout the double-containment piping system.

Double-containment piping systems are also employed in natural gas pipelines, particularly where such pipelines pass beneath roadways. In these applications, the primary pipe is housed within an outer casing or containment pipe, which provides structural protection for the primary pipe by isolating the primary pipe from potentially harmful dynamic loads due to vehicular traffic on the roadway. Because the natural gas pipelines and their containment pipes are made of steel, it is important to isolate the primary pipe from the containment pipe with a nonmetallic centralizing device. If the annulus between the primary and containment pipes were to fill with water, the nonmetallic centralizing device may prevent the water from causing galvanic corrosion. In this type of application, the centering support would also function as a "casing insulator".

It is an object of the present invention to overcome the drawbacks and disadvantages of prior art centering supports for double-containment piping systems.

SUMMARY OF THE INVENTION

The present invention is directed to a centering support for a double-containment pipe assembly adapted to support a plurality of primary pipes within a single containment pipe. A first support half of the centering support defines a plurality of first curved support surfaces for supporting one or more primary pipes, wherein each first curved support surface is defined by a radius greater than or equal to the outside radius of the primary pipe to be supported by the respective support surface. A second support half of the centering support similarly defines a plurality of second curved support surfaces for supporting one or more primary pipes, and each second curved support surface is defined by a radius greater than or equal to the outside radius of the primary pipe to be supported by the respective support surface. The centering support further comprises means for joining the first support half to the second support half and moving the first and second support halves toward each other, to in turn move the first and second curved support surfaces toward the at least one respective primary pipe and fix the primary pipes within the containment pipe.

Preferably, the first support half of the centering support further defines a third curved surface substantially conforming to the curvature of the inside surface of the containment pipe, and the second support half similarly defines a fourth curved surface substantially conforming to the curvature of the inside surface of the containment pipe. The centering support also preferably comprises at least one layer of resilient material interposed between one or more of the first and second curved support surfaces and the respective primary pipes.

One advantage of the centering support of the present invention is that it may be employed to support a wide variety, and plurality of primary pipes within a single containment pipe.

Another advantage of the centering support of the present invention is that it does not have to be welded or otherwise bonded to either the inner or outer pipe, but rather is mechanically coupled to the inner pipe, preferably by at least one fastening member. This results in significant time savings, and thus cost savings in assembling a double-containment pipe assembly.

Other advantages of the centering support of the present invention will become apparent in view of the following detailed description and accompanying drawings.

BRIEF DESCRIPTION OF THE DRAWINGS

FIG. 3 is a cross-sectional view of another centering support embodying the present invention formed by coupling together two upper halves of the centering support of FIG. 1.

FIG. 4 is a cross-sectional view of another centering support embodying the present invention formed by coupling together essentially two lower halves of the centering support of FIG. 1.

FIG. 9 is a front plan view of the centering support of FIG. 7 shown assembled for supporting a plurality of primary pipes within a single containment pipe.

FIG. 10 is another front plan view of the centering support of FIG. 7 illustrating another embodiment of an internal support fixture for supporting a plurality of primary pipes within a single containment pipe.

DETAILED DESCRIPTION

Figure 1:
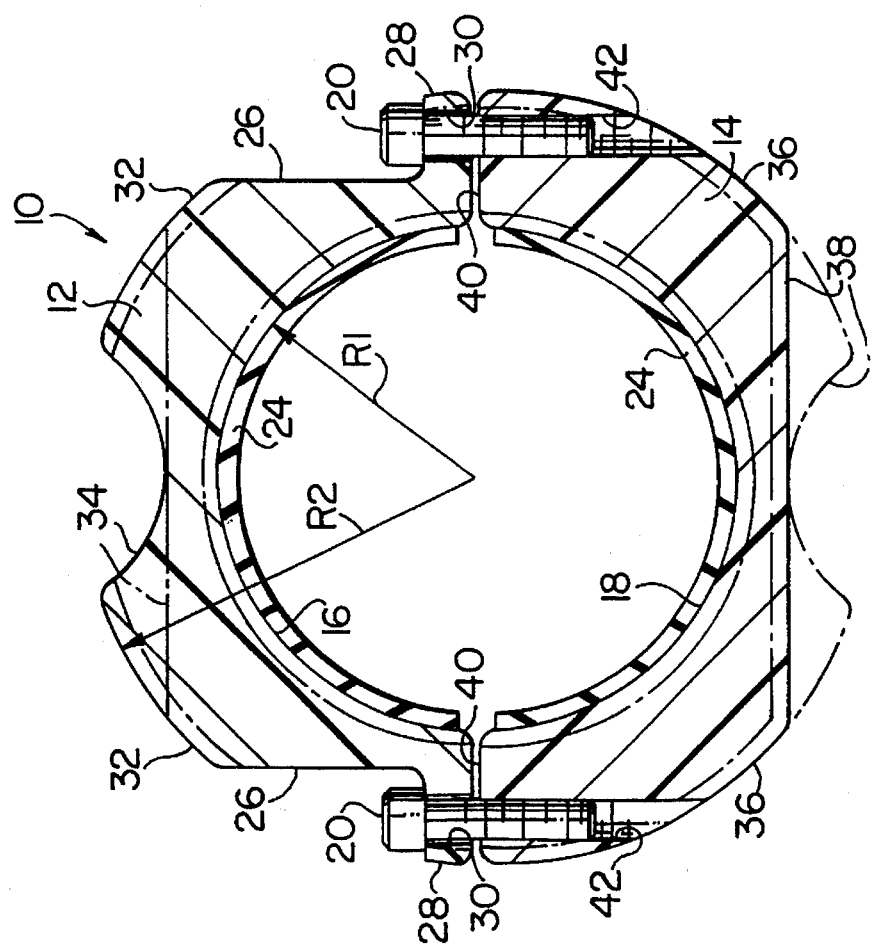
FIG. 1 is cross-sectional view of a centering support embodying the present invention taken along the line 1—1 of FIG. 2.

In FIG. 1, a centering support embodying the present invention is indicated generally by the reference numeral 10. The centering support 10 includes an upper half 12 and a lower half 14. The upper half 12 defines an upper semicircular surface 16, and the lower half 14 defines a lower semi-circular surface 18. The upper and lower halves 12 and 14 are fitted over a primary pipe A, illustrated in phantom lines in FIG. 2, and coupled together by fasteners 20. In the embodiment of the present invention illustrated, the fasteners 20 are bolts having either socket or allen heads, and threaded portions for attachment to the lower half 14. An elastomeric or other type of resilient material 24 is preferably fitted between the upper and lower semi-circular surfaces 16 and 18, respectively, to facilitate the ability to tightly couple the upper and lower halves onto the primary pipe A. The semi-circular surfaces 16 and 18 are each defined by a radius R1, which is preferably slightly greater than the outside radius of the primary pipe A to permit insertion of the elastomeric material 24 between the primary pipe A and centering support 10.

As shown in FIG. 1, the upper half 12 has a generally omega-shape, which is defined by flats 26 on either side of the upper half relative to each other, a curved top surface 32 extending between the flats 26, and corresponding flange portions 28, each oriented substantially perpendicular to a respective flat 26. Each flange portion 28 defines an aperture 30 for receiving a respective fastener 20. Each flat 26 is substantially parallel to the vertical centerline of the upper half 12 to facilitate insertion of a socket or allen wrench, or other type of tool adjacent to the flat to tighten or remove the respective fastener 20.

Figure 2:
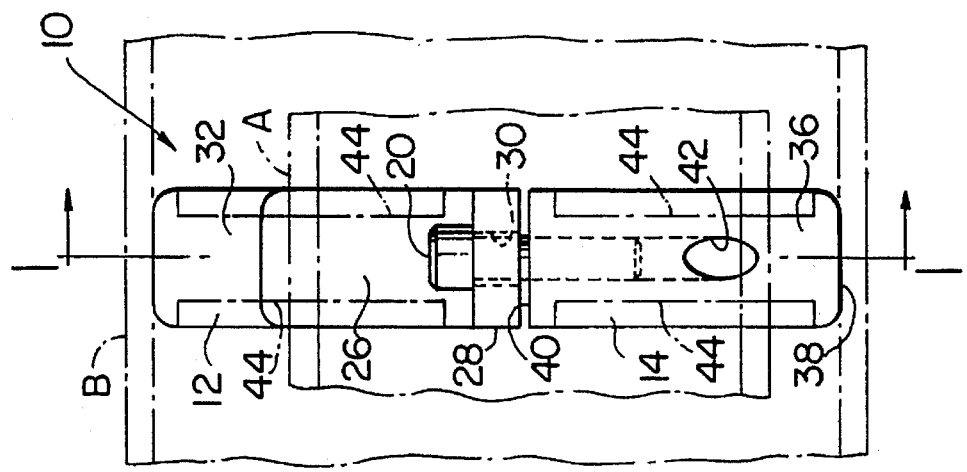
FIG. 2 is side view of the centering support of FIG. 1.

The top surface 32 is defined by a radius R2, which is slightly less than the inside radius of an outer or containment pipe B, illustrated in phantom lines in FIG. 2, to permit insertion of the assembled centering support 10 and primary pipe A within the outer pipe B. The edges of the top surface 32 are preferably beveled, as shown by phantom lines in FIG. 1, to facilitate insertion within the outer pipe B. A generally semi-circular cut-out 34 may be formed within the approximate central portion of the top surface 32 to permit continuous flow of air within the annulus between the primary pipe A and the outer pipe B. The cut-out 34 may take any of numerous shapes to permit the flow of air through the annulus. For example, the cut-out 34 may equally take the shape of a flat or chord, as indicated by phantom lines in FIG. 1. The transition points between the various surfaces are preferably defined by either a smooth radius or fillet, as shown in FIG. 1, to prevent localized stress under load, such as when the fasteners 20 are tightened.

The lower half 14 is generally saddle-shaped, as shown in FIG. 1, and includes a lower surface 36 also defined by the radius R2. The edges of the lower surface 36 are also preferably beveled, as indicated by phantom lines in FIG. 1, to facilitate insertion of the assembled centering support 10 and primary pipe A within the outer pipe B. A flat surface (or chord) 38 may be formed in the approximate central portion of the lower surface 36 to permit the drainage of fluid, if any, through the annulus between the inner and outer pipes. The surface 38 may take any of numerous shapes to permit the flow of fluid through the annulus. For example, the surface 38 may take the shape of a semi-circle as indicated in phantom lines in FIG. 1. The distal ends of the lower half 14 are each defined by a flat surface 40 for seating against a respective flange portion 28 of the upper half 12. A threaded aperture 42 is formed within each flat surface 40 for receiving the threaded portion of a respective fastener 20 to clamp the upper and lower halves together around the primary pipe A. As with the upper half 12, the transition points between the various surfaces of the lower half 14 are each preferably defined by a smooth radius to prevent localized stress under load.

The upper and lower halves 12 and 14 may be constructed of any suitable material, including metal, reinforced thermosetting plastic, or thermoplastic. The upper and lower halves 12 and 14 may also include recesses 44 formed in the side surfaces, as indicated by phantom lines in FIG. 2. The recesses 44 are particularly suitable when the halves 12 and 14 are formed by injection molding, resin transfer molding, compression molding, or casting, for example. The recesses 44 not only result in the use of less material for the halves 12 and 14, but can also increase the overall strength of the centering support 10 by forming a ribbed configuration. The recesses 44 are dimensioned in a manner known to those of ordinary skill in the art so as to leave sufficient wall thickness adjacent to the threaded apertures 42 to avoid failure.

In FIG. 3, another embodiment of the present invention is illustrated in which the centering support 10 is formed by two upper halves 12 which can be coupled together on an inner pipe A. The two upper halves 12 are each the same as the upper half 12 described above in connection with FIGS. 1 and 2, and therefore like reference numerals are used to indicate like elements. In this embodiment of the present invention, the adjacent flange portions 20 are coupled together by bolts extending through the aligned apertures 30 and secured in place by respective nuts. One advantage of this embodiment of the present invention is that it is only necessary to manufacture the upper half 12, thus reducing the overall cost of the double-containment piping system.

In FIG. 4 another embodiment of the present invention is illustrated, in which two lower halves 14 are coupled together to form the centering support 10. In this embodiment of the present invention each lower half 14 is essentially the same as the lower half described above in connection with FIG. 1, and therefore like reference numerals are used to indicate like elements. The two halves 14 differ only in that the top half has counter-sunk holes 45 defined in the surface 36 to receive the fasteners 20 and a cut-out 34 rather than a flat 38. The other half 14 has corresponding threaded holes 42, as described above, for receiving the threaded portions of the fasteners to couple the two halves together onto the inner pipe. This centering support is similarly advantageous in that because the two halves are very similar in construction the overall complexity, and thus cost of the centering support is reduced.

Figure 6:
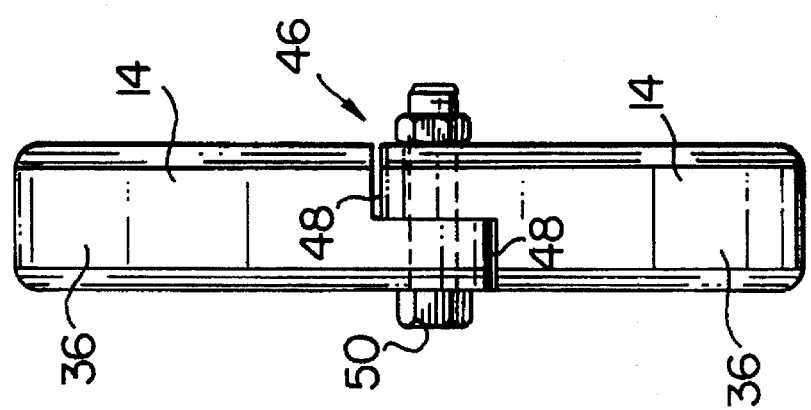
FIG. 6 is a side view of the centering support of FIG. 5.
Figure 5:
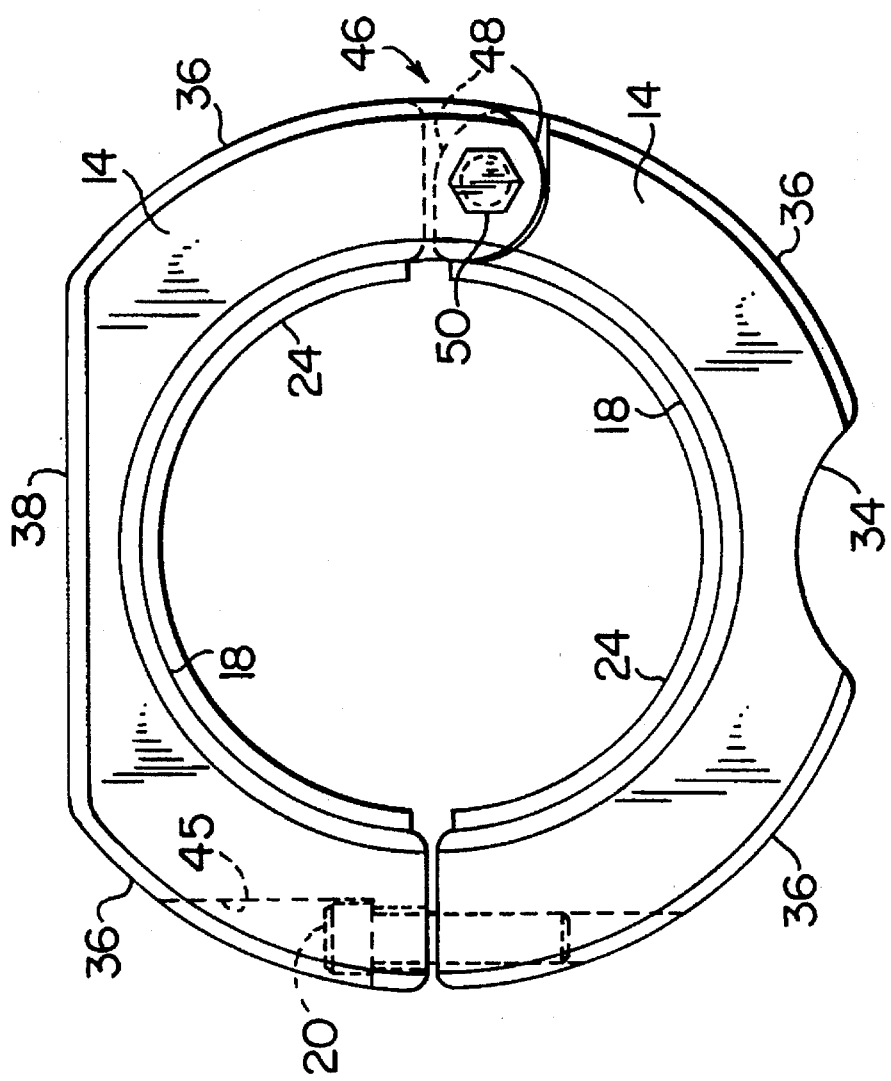
FIG. 5 is a front plan view of another centering support embodying the present invention in which the two halves of the centering support are coupled together by a hinge assembly.

In FIGS. 5 and 6 another embodiment of the present invention is illustrated which is similar to the embodiment of FIG. 4, and therefore like reference numerals are used to indicate like elements. The embodiment of FIGS. 5 and 6 differs from the embodiment of FIG. 4 essentially in that the two halves 14 are coupled together on one end by a hinge assembly 46, and coupled together on the other end by a fastener 20. The hinge assembly 46 is formed by a pair of lobes 48, each formed on one end of a respective half 14, and coupled together by a hinge fastener 50. Thus, the centering support can be opened by moving the two halves relative to each other about the hinge assembly 46 to fit the support over the inner pipe. The centering support can then be firmly coupled to the inner pipe by tightening the fastener 20. As will be recognized by those skilled in the art, numerous different hinge configurations may be employed. One advantage of this embodiment of the present invention, is that the time required for assembly of the centering support to the primary pipe is reduced because only one fastener is required to attach the centering support to the primary pipe.

Turning to FIGS. 7 through 10, another embodiment of the present invention is indicated generally by the reference numeral 110. The centering support 110 is similar in many respects to the centering support 10 shown in FIG. 3, and therefore like reference numerals preceded by the numeral 1 are used to indicate like elements. The primary difference of the centering support 110 is that it is capable of supporting one or more primary pipes A within a single containment pipe B.

Figure 7:
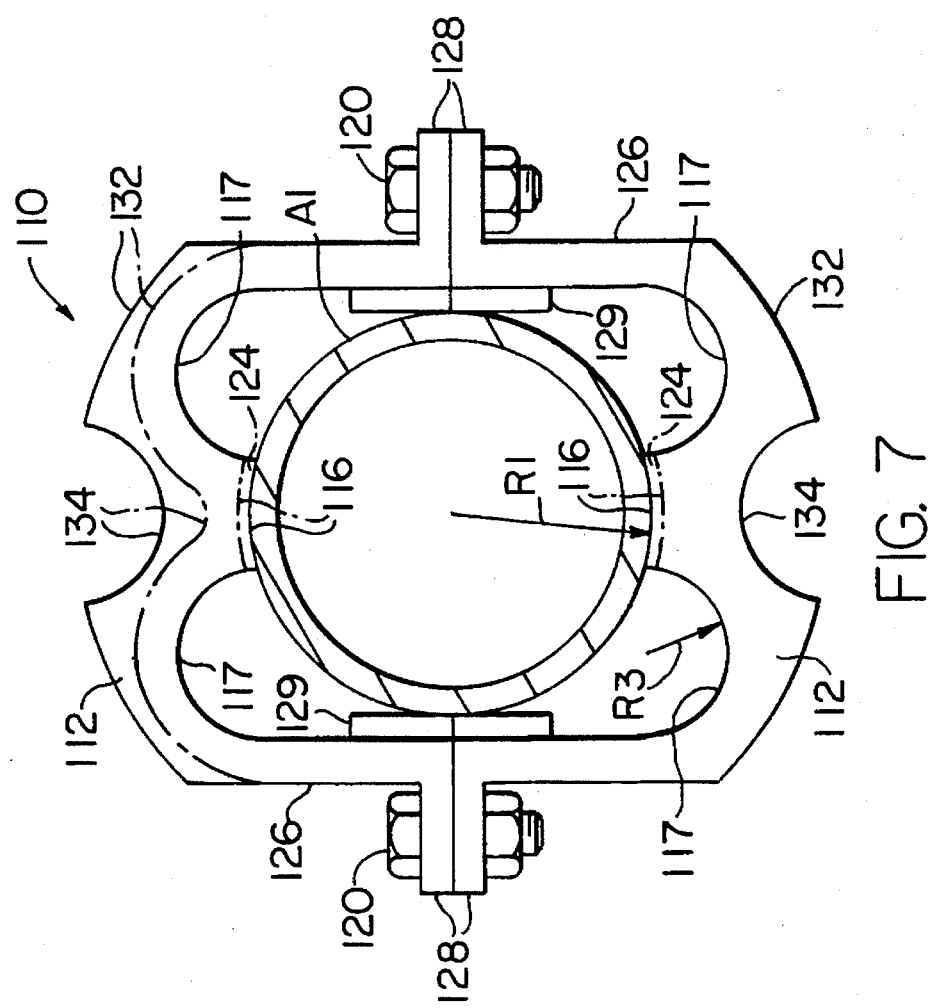
FIG. 7 is a front plan view of another centering support embodying the present invention which is capable of supporting one or more primary pipes within a containment pipe and shown assembled for supporting a single primary pipe within a containment pipe.

As shown in FIG. 7, each support half 112 defines a first curved surface 116 formed in the center of the respective half, and two second curved surfaces 117 formed on either side of the first curved surface. As shown in FIG. 7, the two first curved surfaces 116 are shaped to support a single primary pipe A1; and as shown in FIGS. 9 and 10, each second curved surface 117 is shaped to support a respective second primary pipe A2 for alternatively supporting a plurality of primary pipes A2 within a single containment pipe. The first curved surfaces 116 are each defined by the radius R1, and the second curved surfaces are each defined by a radius R3. The radii R1 and R3 of the curved surfaces are greater than or equal to the radii of the primary pipes A1 and A2, respectively. In instances where the resilient, elastomeric material 124 is inserted between one or more primary pipes and the support (typically when the centering support is harder than the primary pipe, or where otherwise necessary to prevent points of concentrated stress or diametrical deformation), the radii R1 and R3 of the curved surfaces are greater than the radii of the primary pipes A1 and A2, respectively.

Figure 8:
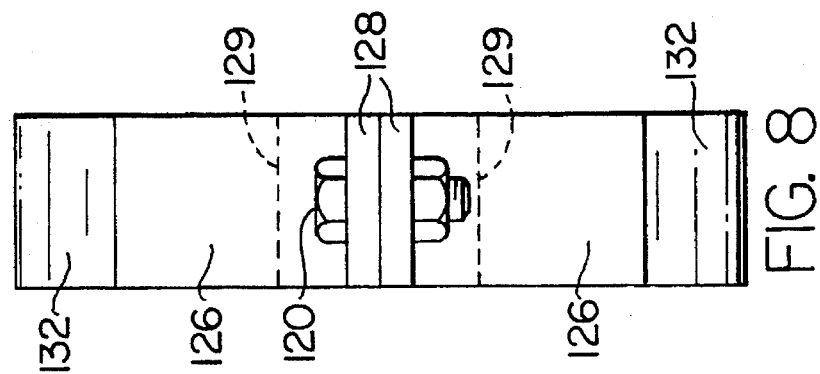
FIG. 8 is a side plan view of the centering support of FIG. 7.

Each support half 112 further defines a pair of internal flange portions 129, each formed on a respective side of the support half immediately above the adjacent second curved surface 117. As shown in FIGS. 7 and 8, upon attachment of the two support halves to each other with the bolts 120, each pair of internal flange portions 129 forms a continuous flange extending between the two support halves on a respective side of the support.

As shown in FIG. 7, when the centering support 110 is used to support a single primary pipe A1, the flange portions 129 may provide lateral support for the primary pipe depending upon its diameter. If necessary, a strip of resilient, elastomeric material 124 may be attached to each flange portion and interposed between the flanges and the primary pipe to prevent points of concentrated stress and/or diametrical deformation in the primary piping due, for example, to surface irregularities in either the support or the primary pipe.

As shown in FIG. 9, when the centering support 110 is used to support a plurality of primary pipes A2, internal supports 131 may each be mounted to a respective internal flange portion 129 to fix each primary pipe A2 against the respective curved support surface 117. Each internal support 131 defines a beveled or curved edge portion 133 for engaging the external surface of the respective primary pipe A1 to support and fix the primary pipe against the respective curved surface 117. The internal supports 131 are preferably made of a suitably durable elastomeric or thermoplastic material, in order to firmly support the primary pipes, yet absorb and dampen vibrational forces transmitted between the pipes and the support. If the internal supports 131 are made of metal, it may be desirable to attach strips of resilient material 124 to the beveled or curved edges 133 of the supports to dampen vibrational forces and/or prevent points of concentrated stress.

Each internal support 131 also defines a mounting recess 135 on its backside for receiving the respective internal flange portions 129 and fixedly attaching the internal supports to the flanges. The internal supports 131 and flanges 129 may include any of numerous means for attaching the supports to the flanges. For example, each internal support may include tongue portions and the internal flanges may define corresponding grooves in their side surfaces or edges to receive the tongue portions. Similarly, the internal supports may include mounting surfaces or lips dimensioned to snap fit over or into corresponding grooves formed in the internal flanges. If desired, a suitable adhesive may be applied to the interface between the flanges and the internal supports and used in addition to, or as an alternative to the above-mentioned means for attaching the support inserts to the flanges.

Turning to FIG. 10, as an alternative to the internal supports 131, an internal support fixture 139 may be mounted to the internal flanges 129 to fix each primary pipe A2 against the respective curved support surface 117. The support fixture 139 defines on each of its four corners a curved surface 141 for engaging the external surface of the respective primary pipe A2 to support and fix the primary pipe against the respective curved surface 117. The support fixture 139 may be in the form of a plate, or if additional support surface is necessary, the support fixture may extend throughout the full width of the centering support in the axial direction of the pipes. Strips of resilient material 124 are preferably attached to each of the curved support surfaces 141 and interposed between the support surfaces and the primary pipes to dampen vibrational forces and/or prevent points of concentrated stress.

As shown in FIG. 10, the internal support fixture 139 defines a pair of mounting recesses 143 formed on opposite sides of the support relative to each other for receiving the respective internal flange portions 129 and fixedly attaching the internal support fixture to the flanges. As with the embodiment of FIG. 9, the internal support fixture 139 and internal flanges 129 may include any of numerous known means for attaching the support fixture to the flanges, such as a tongue-and-groove arrangement, a snap-fit mechanism (particularly when the support fixture is in plate form), with or without an adhesive applied to the interface between the support fixture and the flanges.

As will be recognized by those skilled in the pertinent art, the internal support fixture 139 may include additional curved support surfaces 141 located adjacent to the center support surfaces 116 to fix and support additional primary pipes A2 against the center support surfaces. Accordingly, the support fixture 139 may be employed to accommodate a range of between one and six primary pipes A2. If additional support surfaces are added to each support half, then additional primary pipes may be supported within a single containment pipe.

As will also be recognized by those skilled in the pertinent art, the halves 112 of the centering support 110 may be made of numerous materials depending upon the particular application of the double-containment piping system. For example, the centering support can be made of thermoplastic materials (mass produced by injection molding), fiberglass reinforced thermosetting materials (mass produced by compression or resin-transfer molding), and a variety of metals (mass produced by casting, forging and other techniques). It may be particularly desirable to make the outer halves of the support from a first type of material, such as a thermoplastic, and the internal supports (131 or 139) from a dissimilar material, such as a metal or elastomer.

A particular advantage of the centering support 110 of the invention is that the same support may be employed to support a wide variety of primary pipes within a single containment pipe. Each support surface 116 and 117 can support a plurality of different sized primary pipes, so long as the radius of each primary pipe is less than the respective radius R1 or R3 of the support surface. Indeed, for a given radius R1 or R3, virtually any size or type of smaller primary pipe or tubing can be accommodated by the respective surface, creating tremendous flexibility in designing double-containment piping systems, or alternatively viewed, reducing the number of supports needed to be inventoried in order to satisfy a wide variety of combinations of primary pipe diameters.

Another advantage of the centering support 110 of the invention is that the configuration of the three support surfaces in each support half permits easy and relatively inexpensive modification of the mold or die for forming the support halves to adjust the support-surface configuration. For example, each center support surface 116 can be extended to engage up to 180° of the primary pipe's external surface by forming an insert for the mold or die to fill the recesses created by the concave support surfaces 117.

Yet another advantage of the centering support 110 is that it is relatively economical to manufacture because material is removed from the support to form the scalloped or concave support surfaces. This is particularly so if the support is employed as a casing insulator for natural gas pipelines. By removing material in the vicinity of the curved support surfaces, the centering support is relatively economical to mold (e.g., injection or compression mold) or form in comparison to casing insulators typically used in the past.

As shown typically in phantom lines in FIG. 7, the centering support 110 may be formed so that the body of each half 112 defines a substantially uniform wall thickness throughout the respective support half. By forming each support half 112 in this manner, the centering support is particularly suited for manufacture by forming or stamping each support half from a metal sheet of uniform thickness. This construction also enhances the ability to injection mold each support half from a wide variety of thermoplastic materials, and in turn lowers the overall cost of manufacture by utilizing the minimum amount of material necessary.

Another advantage of the centering support of the present invention is that it can be used to electrically isolate the primary pipe A from the outer pipe B, or from other components of the double-containment piping system. For example, if the primary pipe A and outer pipe B are metal, the centering support 10 can be made from a non-metallic material, such as a thermosetting plastic, and thus can effectively electrically isolate the primary pipe from the outer pipe. With prior centering support devices which require welding or otherwise bonding of the centering support to the inner pipe, this advantage cannot be achieved. In the system of the present invention, because the two halves are simply mechanically coupled together on the inner pipe, electrical isolation can be easily and inexpensively achieved between the inner and outer pipes.

Yet another advantage of the centering support of the present invention is that because the inside surfaces (16, 18, 116 and/or 117) substantially conform to the outer diameter of the inner pipe, and the two halves are mechanically coupled together, the centering support is firmly engaged with the inner pipe throughout a substantial portion of the circumference of the inner pipe to support the inner pipe. The degree to which the centering support engages the inner pipe is selected by adjusting the fastener(s) 20. With prior one-piece collar type supports, for example, this result typically cannot be achieved because the inner diameter of the collar support is inherently greater than the outer diameter of the inner pipe.

Another advantage of the centering support of the present invention is that the support does not have to be welded or otherwise bonded to either the inner or outer pipe as with prior centering supports for double-containment piping systems. Rather, the centering support of the present invention is mechanically coupled to the primary pipe by tightening the fasteners, which in turn drives the two halves together into firm engagement with a substantial portion of the circumference of the inner pipe. Accordingly, it is significantly easier and faster to assemble a double-containment piping system with the centering supports of the present invention in comparison to systems using one-piece collar supports, or supports similarly requiring welding or bonding for assembly.

It is noted that numerous variations can be made to the centering support that are within the scope of the present invention. For example, the particular shape and location of the cut-outs to permit the flow of air or the drainage of fluid through the annulus between the inner and outer pipes may be varied, along with the location of the cut-outs. For example, it may be desirable to form apertures through one or both halves to perform this same function.

It is also noted that numerous types of fastening means may be employed to couple the upper and lower halves together. Hex-head, socket-head, or allen-head fasteners are only examples of the numerous types of fasteners that may equally be employed. The particular surface configuration of the flats 26 may also be varied as long as they are shaped to permit insertion of a socket wrench, or other type of tool, for tightening the fasteners 20. For example, the flats 26 may be formed with a curved surface configuration.

Accordingly, it is to be understood that the present invention has been disclosed herein in an illustrative as opposed to a limiting sense, and that numerous changes may be made to the above-described and other embodiments of the invention without departing from the scope of the appended claims.

What is claimed is:

1. A centering support for a double-containment pipe assembly adapted to support a plurality of primary pipes within a containment pipe, comprising:

a first support half defining a plurality of curved support surfaces for supporting at least one primary pipe, including a first curved support surface and two second curved support surfaces located on opposite sides of the first curved support surface relative to each other and each being recessed within the first support half relative to the first curved support surface, each curved support surface being defined by a radius at least equal to the outside radius of the primary pipe to be supported by the respective support surface;

a second support half defining a plurality of curved support surfaces for supporting at least one primary pipe, including a first curved support surface and two second curved support surfaces located on opposite sides of the respective first curved support surface relative to each other and each being recessed within the second support half relative to the respective first curved support surface, each curved support surface being defined by a radius at least equal to the outside radius of the primary pipe to be supported by the respective support surface; and means for joining the first support half to the second support half and moving the first and second support halves toward each other to move the curved support surfaces toward the at least one respective primary pipe to fix and support the at least one primary pipe within the containment pipe.

2. A centering support for a double-containment pipe assembly adapted to support a plurality of primary pipes within a containment pipe, comprising:

a first support half defining a plurality of first curved support surfaces for supporting at least one primary pipe, each first curved support surface being defined by a radius at least equal to the outside radius of the primary pipe to be supported by the respective support surface;

a second support half defining a plurality of second curved support surfaces for supporting at least one primary pipe, each second curved support surface being defined by a radius at least equal to the outside radius of the primary pipe to be supported by the respective support surface;

means for joining the first support half to the second support half and moving the first and second support halves toward each other to move the first and second curved support surfaces toward the at least one respective primary pipe to fix and support the at least one primary pipe within the containment pipe; and at least one layer of resilient material interposed between at least one of the first and second curved support surfaces and a respective primary pipe.

3. A centering support as defined in claim 1, wherein at least one of the first and second support halves defines an internal flange portion located adjacent to a respective curved support surface for laterally supporting a respective primary pipe.

4. A centering support as defined in claim 3, wherein each of the first and second support halves defines a respective internal flange portion forming a substantially continuous internal flange between the first and second support halves for laterally supporting at least one primary pipe.

5. A centering support for a double-containment pipe assembly adapted to support a plurality of primary pipes within a containment pipe, comprising:

a first support half defining a plurality of first curved support surfaces for supporting at least one primary pipe, each first curved support surface being defined by a radius at least equal to the outside radius of the primary pipe to be supported by the respective support surface;

a second support half defining a plurality of second curved support surfaces for supporting at least one primary pipe, each second curved support surfaces being defined by a radius at least equal to the outside radius of the primary pipe to be supported by the respective support surface;

means for joining the first support half to the second support half and moving the first and second support halves toward each other to move the first and second curved support surfaces toward the at least one respective primary pipe to fix and support the at least one primary pipe within the containment pipe; and wherein at least one of the first and second support halves defines an internal flange portion located adjacent to a respective curved support surface for laterally supporting a respective primary pipe, and the centering support further comprises a layer of resilient material interposed between the internal flange portion and the respective primary pipe.

6. A centering support as defined in claim 1, further comprising at least one internal support coupled to one of the first and second halves for supporting a primary pipe against a respective curved support surface.

7. A centering support as defined in claim 6, wherein the at least one internal support defines a support surface substantially conforming to and engaging an outer surface of the primary pipe.

8. A centering support as defined in claim 6, further comprising means for dampening vibrational forces transmitted between the centering support and a primary pipe.

9. A centering support as defined in claim 8, wherein the means for dampening includes at least a portion of the internal support formed of at least one of an elastomeric or thermoplastic material.

10. A centering support as defined in claim 1, further comprising means for electrically insulating at least one primary pipe from the containment pipe.

11. A centering support as defined in claim 10, wherein the means for electrically insulating includes the first and second support halves formed substantially entirely of non-metallic material.

12. A centering support for a double-containment pipe assembly adapted to support a plurality of primary pipes within a containment pipe, comprising:

a first support member;

a second support member;

means for mounting the plurality of primary pipes between the first and second support members including a plurality of pairs of opposing curved support surfaces defined by the first and second support members, wherein each of the first and second support members defines a first curved support surface and two second curved support surfaces located on opposite sides of the first curved support surface relative to each other and recessed within the respective support member relative to the respective first curved support surface; and means for adjusting the positions of the first and second support members relative to each other to fix and support at least one primary pipe within the containment pipe.

13. A centering support as defined in claim 12, wherein at least one of the first and second support members defines an internal flange located adjacent to a respective curved support surface for laterally supporting a respective primary pipe.

14. A centering support as defined in claim 12, further comprising means for dampening vibrational forces transmitted between the centering support and a primary pipe.

15. A centering support as defined in claim 12, further comprising means for electrically insulating at least one primary pipe from the containment pipe.

16. A centering support as defined in claim 12, wherein the means for adjusting includes at least one fastener coupling the first and second support members to each other.

17. A centering support for a double-containment pipe assembly adapted to support a plurality of primary pipes within a containment pipe, comprising:

a first support member, and a second support member coupled to the first support member, wherein each of the first and second support members defines a first curved support surface and two second curved support surfaces located on opposite sides of the first curved support surface relative to each other, and each second curved support surface is recessed within the support member relative to the respective first curved support surface for alternatively mounting one primary pipe between the two first curved support surfaces or more than one primary pipe on the second curved support surfaces.

18. A centering support as defined in claim 17, further comprising at least one fastener attached to the first and second support members for adjusting the positions of the first and second support members relative to each other to fix and support the at least one primary pipe within the containment pipe.

* * * * *